Jan. 30, 1968   S. F. HEMMENWAY ETAL   3,366,870
VOLTAGE REGULATOR
Filed June 22, 1964   2 Sheets-Sheet 1

INVENTORS
STUART F. HEMMENWAY
GEORGE M. ROSENBERRY, JR.
BY
*James L. Campbell*
THEIR ATTORNEY

United States Patent Office 3,366,870
Patented Jan. 30, 1968

3,366,870
VOLTAGE REGULATOR
Stuart F. Hemmenway, Scotia, and George M. Rosenberry, Jr., Schenectady, N.Y., assignors to General Electric Company, a corporation of New York
Filed June 22, 1964, Ser. No. 376,648
4 Claims. (Cl. 322—59)

ABSTRACT OF THE DISCLOSURE

A full wave static exciter regulator is provided with power from terminals adapted for connection to a single phase source. Basic regulator circuits as shown whose function is to hold the alternator output voltage constant as voltage changes take place in the load. Generally, when the load varies from a predetermined value, the sensing circuit detects such changes and provides a rectified voltage which is compared with a reference voltage. The difference voltage causes transistors in a firing circuit to conduct a current having a magnitude proportional to the difference voltage, and steering diodes direct the firing pulse energy to either one of two silicon-controlled rectifiers which conduct for the remainder of that half cycle. Thereafter, the other controlled rectifier fires for the other and subsequent half cycles for a time period proportional to the error voltage to reduce the difference voltage to a minimum value and thereby achieve restoration of the desired output voltage.

---

Figure 1:
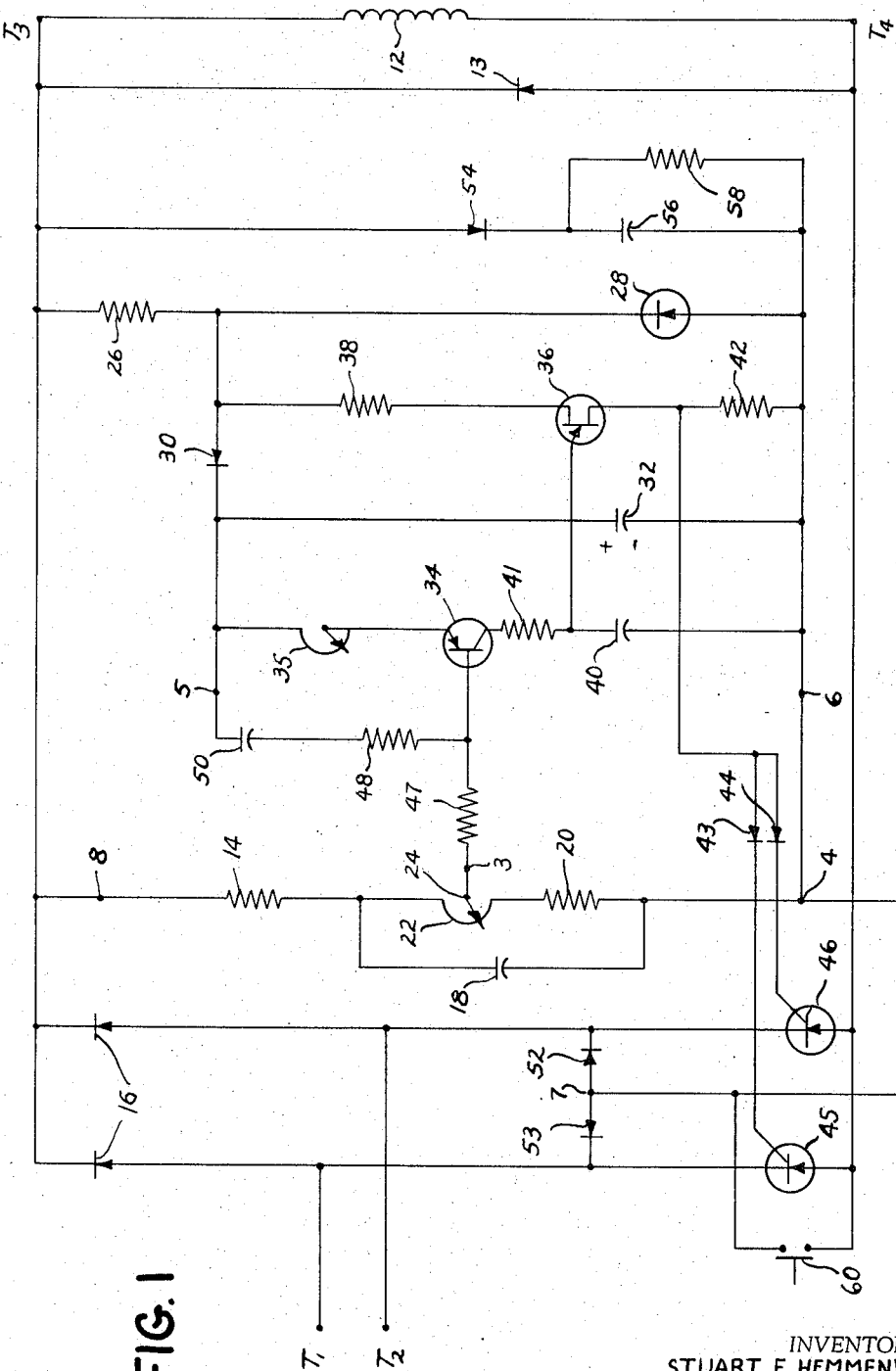

The invention described herein relates to voltage regulators and more particularly to an improved low cost, high performance regulator useful in controlling the output voltage of an alternator or generator.

The regulator disclosed in application Ser. No. 325,041, now Patent No. 3,289,071, filed Nov. 20, 1963 in the name of George M. Rosenberry, Jr., and assigned to the same assignee as the present invention, includes sensing, reference, stabilizing and firing voltage circuits and a power circuit useful in controlling a generator or alternator furnishing constant voltage to a load. That disclosure also includes a volts per cycle or voltage proportional to frequency regulator having characteristics useful in improving the speed of response of those known in the prior art. Although the circuit arrangements of the Rosenberry application provide satisfactory operation and performance, it has been found that greater magnitudes of power preferably should be made available by the regulator for application directly to an alternator or generator field winding, rather than to a separate exciter which in turn supplies the needed excitation power to a field winding for maintaining the alternator or generator output voltage to the load at constant values. An example of the kind of application wherein better performance at lower cost regulators is needed is in regulating the speed of a DC motor by regulating the field current to obtain improved speed of response.

Another important improvement needed to be made lies in control over conducting times for the controlled rectifier to eliminate the possibility of the firing circuit voltage collapsing during the time the controlled rectifier is firing, and consequently possibly losing the ability to continue firing the controlled rectifier and thereby losing the application of power to the field winding. Success of regulator operation in the filed application depends on the controlled rectifier turning off and regaining forward blocking capability in about 10 microseconds which raises the possibility of commutation failure inherent in the system. Since the turnoff time must be controlled with accuracy and precision, relatively high cost and reliable controlled rectifiers and other circuit components were required.

In view of these minor limitations existing in regulators of the prior art, and particularly the regulator disclosed in said prior application, it is apparent the need exists for an improved regulator capable of providing higher performance at lower cost and the primary object of our invention therefore is to satisfy this stated need.

Another object of our invention is to provide an improved voltage regulator wherein excitation power is available for application to an alternator or generator field winding throughout each entire cycle of output voltage.

Still another object of our invention is the provision of a regulator of higher performance and less cost than comparable regulators of the prior art.

In carrying out our invention, sensing, stabilizing, firing, and reference voltage and power circuits are incorporated in the same design of regulator as disclosed in the above identified Rosenberry application. To improve the performance, a pair of semiconducting devices associated with the power source and the generator or alternator field winding, are alternately converted to a conducting state by the circuits identified above as required to maintain the alternator or generator output voltage. The arrangement of components in the circuit is such that either one or the other semiconductor device will conduct in accordance with the polarity of the regulator input terminals, thus permitting application of excitation voltage to the field winding for any part of both half cycles or for a whole cycle if necessary. This circuit design permits the use of lower cost components in the system. Since precise control over the semiconductor device characteristics does not have to be maintained as in prior regulators, the complete regulator is more reliable, of higher performance and lower cost.

Still another object of our invention is to provide a regulator capable of producing sufficient power to excite the generator or alternator field winding directly to obtain the desired changes in alternator output voltage.

Figure 2:
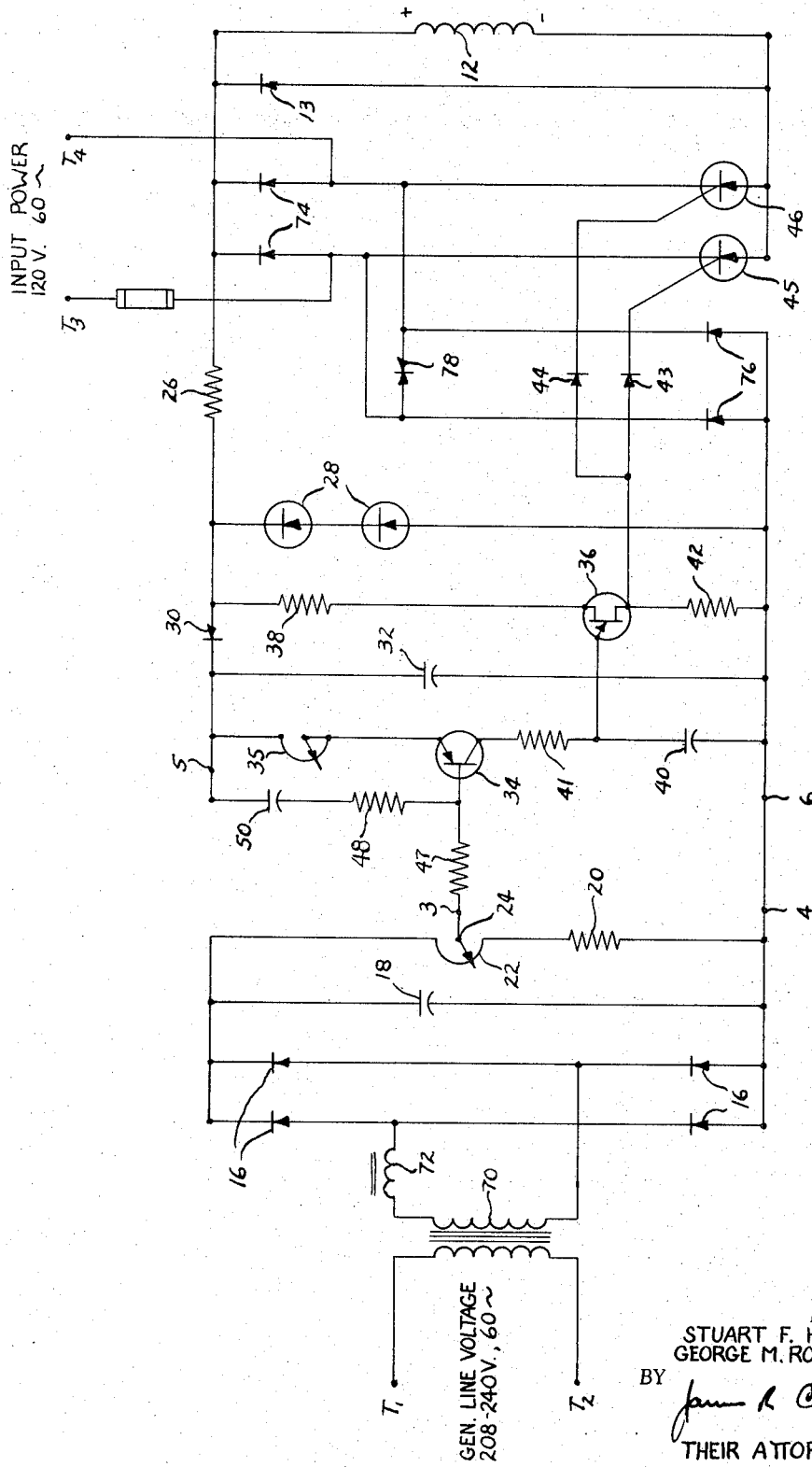

While the specification concludes with claims particularly pointing out and distinctly claiming the subject matter which we regard as our invention, it is believed the invention will be better understood from the following description taken in connection with the accompanying drawings in which:

FIGURE 1 is a diagrammatic view of a single phase full-wave regulator useful in controlling the output voltage of a generator or alternator; and FIGURE 2 is a modification of FIGURE 1 illustrating a circuit arrangement wherein a separate source of power is used for supplying power to the regulator and to a field winding for controlling the generator or output voltage.

Referring now to the drawings wherein like reference characters designate like or corresponding parts throughout the several views, there is shown in FIGURE 1, a full wave static exciter regulator provided with power from terminals $T_1$ and $T_2$ adapted for connection to a single phase source. The circuit shown includes the basic regulator circuits disclosed in the Rosenberry application whose function is to hold the alternator output voltage contant as voltage changes take place in the load. Generally, when the load voltage varies from a predetermined value, the sensing circuit detects such changes and provides a rectified voltage which is compared with a reference voltage. The difference voltage causes transistors in a firing circuit to conduct a current having a magnitude proportional to the difference voltage, and steering diodes direct the firing pulse energy to either one of two silicon controlled rectifiers which conduct for the remainder of that half cycle. Thereafter, the other controlled rectifier fires for the other and subsequent half cycles for a time period proportional to the error voltage to reduce the difference voltage to a minimum value and thereby achieve restoration of the desired output voltage.

Referring more specifically to the single phase bridge circuits shown, a pair of power rectifiers 16 are connected to terminals $T_1$, $T_2$ supplying power to the regulator and to the alternator field winding 12. Current is circulated through the field winding 12 and diode 13 when the controlled rectifiers 45 or 46 are not conducting. As disclosed in said application, resistor 14 and rectifiers 16, 52 and 53 provide unidirectional power of reduced magnitude to a sensing circuit including a resistor 20 and potentiometer 22 which provide a range of adjustment for the sensed voltage supplied from the source to the circuit.

These resistive elements are used initially for adjusting the output voltage of the alternator and at any time thereafter when the load conditions require changing to a different value. The voltage appearing at point 24 is held constant by the regulator and the sensed voltage appears across points 8 and 4 in the circuit.

Reduction of the ripple in the voltage supplied to the sensing circuit is desirable and is accomplished by connecting capacitor 18 to the output from the rectifiers 16. Single phase sensing therefore is provided for, either from a single phase generator or from one phase of a three phase alternator. When three phase voltages are sensed, the capacitor 18 need not be connected in the circuit.

Turning now to the firing circuit, the voltage across terminals $T_1$, $T_2$ of say 120 volts AC comprises the source voltage for both the power and firing circuits in the regulator. It is supplied to the field winding 12 when either one of controlled rectifiers 45 or 46 are conducting as more fully described hereafter. It also is supplied to the regulator through resistor 26 and zener diode 28 which clips and rectifies the voltage to about 20 volts DC. The peak of this voltage is used as the reference voltage which appears across points 5 and 6 in the circuit. Although specific voltage values are used for providing a complete understanding of the invention, it will be apparent other voltage values may be used depending on types, ratings, and the like of components used in the circuits and the type of rating of the alternator or generators.

After being clipped, the rectified voltage of about 20 volts is fed through a low current rectifier 30 to capacitor 32 which charges to the peak zener voltage. This then constitutes the reference voltage and is held constant at a predetermined magnitude of say 20 volts minus the small drop occurring in diode 30. The reference voltage also serves as the power supply voltage for amplifying transistor 34.

Variable resistor 35 is connected to the emitter of transistor 34 and therefore is useful in serving an emitter follower function in stabilizing the gain of the regulator against changes in transistor properties and in providing gain adjustment. It also provides a high input impedance to transistor 34 to obtain better operation of the stabilizing network. Variation of resistor 35 allows for differences in alternator or generator and load characteristics to give optimum performance.

The clipped zener voltage also supplies power to the unijunction transistor 36 through resistor 38 for keeping operation of the firing circuit synchronized with the line voltage. Resistor 38 serves primarily as a temperature compensator and compensates the firing voltage of the transistor against changes in temperature. Diode 30 allows the voltage or transistor 36 to go to zero every half cycle to synchronize the firing with the input frequency.

The reference voltage supplied to transistor 34 in combination with the sensed voltage from potentiometer 22 controls the charging of timing capacitor 40 through resistor 41 which charges until the peak voltage is reached.

A resistor 42, diodes 43 and 44 and the gates of silicon controlled rectifiers 45 and 46 are connected to the output of transistor 36.

The stabilizing circuit includes a resistor 47 connected between potentiometer 22 and the base of transistor 34. This resistor helps to maintain the voltage on the transistor base at the same level as the reference voltage when no changes are taking place in the load and the alternator is supplying constant voltage to the load. It also protects the transistor from the application of sudden voltage surges which otherwise would be harmful to it. The lag network, consisting of resistors 47 and 48 and capacitor 50, makes possible high gain while maintaining a stable system.

An additional new feature in the circuit over that previously disclosed resides in a surge filter used for clipping any voltage spikes or extraneous pulses such as switching transients induced in the circuit from the source which might be harmful to the controlled rectifiers 45 and 46. The filter comprises a diode 54, capacitor 56 and resistor 58. The capacitor 56 preferably is a high capacity electrolytic capacitor which may be paralleled with a smaller nonelectrolytic capacitor (not shown), if necessary. The diode 54 blocks the capacitor voltage off the firing circuit to permit it to maintain synchronization with the line voltage. The resistor 58 is a low power bleeder resistor used for preventing development of excess voltage on the capacitor. In the event switched 60 cycle power is used for the circuit as a volts per cycle static exciter, a small surge resistor may be inserted in series with the diode 54 to prevent damage to the diodes 13, 52 and 53.

Flashing switch 60 is used for shorting one of the controlled rectifiers to provide self build-up in the field winding from residual voltage.

*Operation*

When a decrease in the alternator load voltage occurs thus indicating the need for increased excitation power to the alternator field winding to maintain voltage output to a desired value, the sensed voltage is reduced in magnitude and rectified by the rectifiers 16, 52 and 53. It then is applied through resistor 47 to the base of transistor 34. At this time, the reference voltage appearing across 5, 6 will not have changed because the zener diode 28 maintains the reference voltage at a predetermined value regardless of changes in the load voltage. Assuming the sensed voltage to be less than the reference voltage of about 20 volts, say 17 volts, the difference voltage converts the transistor 34 to a higher conducting state and the capacitor 40 charges earlier in the cycle than under steady state conditions, until it reaches the peak voltage established by zener diode 28. The path for the charging current flow is through diode 30, potentiometer 35 and transistor 34.

The characteristics of unijunction transistor 36 are such that when the voltage on the capacitor 40 reaches about 50–70% (depending upon the transistor parameters) of the voltage across the zener diode 28, the transistor 36 impedance drops and capacitor 40 discharges through it and diode 43 or 44 to the gate of controlled rectifier 45 or 46.

According to the present invention, by employing two controlled rectifiers 45 and 46 in conjunction with the steering diodes 43 and 44 which are rated for full peak line voltage, the firing pulse energy flowing from transistor 36 can be applied directly to the correct controlled rectifier and in the following manner: When $T_1$ is positive, point 7 in the firing circuit is 0.6–0.7 volt positive with respect to the cathode of controlled rectifier 46 and it therefore is in position to fire, but will not fire until the firing pulse from transistor 36 is supplied to it through diode 44. The firing pulse from transistor 36 will be about 10 volts and therefore great enough to cause diode 44 to conduct and turn on controlled rectifier 46. Its anode to cathode voltage is positive and allows conduction of current through it when fired. Because the cathode of controlled rectifier 45 is at positive line voltage, diode 43 is reversed biased and will not conduct current and controlled rectifier 45 will remain in a non-conducting state. Its anode to cathode voltage is negative and not in a position to fire. Current from the source therefore is permitted to flow from $T_1$ through one of the diodes 16, the field winding 12 and controlled rectifier 46 to $T_2$ for the remaining portion of the half cycle, thereby furnishing for that portion of the cycle, the additional excitation necessary to obtain constant voltage output from the alternator.

When $T_2$ becomes positive, the reverse action occurs. Transistor 36 applied its firing pulse energy through diode 43 to the gate of controlled rectifier 45 to convert it to a conducting state and thereby permit current flow through field winding 12 for the other half of the voltage cycle. Since positive line voltage appears on the cathode of controlled rectifier 46, and diode 44 is reversed biased, controlled rectifier 46 cannot conduct current even though a firing pulse is available from transistor 36. It will be noted that both diodes 43 and 44 serve as blocking agents for impeding current flow into the regulator when their respective controlled rectifiers are not conducting. Repetition of the above described action continues until a minimum difference exists between the sensed and reference voltages in the regulator, which indicates that the alternator excitation requirements have been satisfied by firing controlled rectifiers 45 and 46 at the proper steady state of firing angle. As previously indicated, the voltage can be applied to an exciter rather than to the alternator field winding directly in the event a separate exciter is used for furnishing excitation power to the alternator.

It will be understood that since the transistor 34 controls the charging current for capacitor 40, it will be made conducting at an earlier time in the cycle as the difference between the sensed voltage and the reference voltage increases. The time for charging the capacitor, as compared with each cycle will therefore be less, thus charging it sooner. The peak voltage on capacitor 40 accordingly will be reached in a shorter time causing it to discharge sooner and thus turn on the appropriate controlled rectifier 45 or 46 at an earlier time in the positive half of the cycle. Since the controlled rectifier will conduct for a longer period, voltage will be supplied to the exciter field for a longer period of time, thereby providing the larger amount of power needed and which corresponds to the requirements of the alternator to hold the output voltage constant.

It will be apparent to those skilled in the art that with the regulator basic circuits and teachings provided by the description of FIGURE 1, many minor changes can be made therein to control different varieties of electrical equipment. The particular benefits gained from using the single phase bridge power circuit utilizing two controlled rectifiers and the two power rectifiers 16 in the bridge, in addition to the power free wheeling rectifier 13, are that the three rectifiers may be mounted on one heat sink and the two controlled rectifiers on another, thus requiring only two heat sinks rather than a multitude as has been necessary in the past. The voltage applied to the firing circuit is also improved over that disclosed in said prior application since it does not collapse when the controlled rectifiers are converted to a conducting state. The result of this action is improvement in the performance of the regulator. An additional benefit gained by this circuit is use of the steering diodes 43 and 45 which eliminates the need for costly pulse transformers as in the past to the two controlled rectifiers from a single pulse firing source.

The prior circuits use one controlled rectifier which must have a fast turnoff time and the four rectifiers in the bridge must be of the conventionally slow acting type. The more recently available rectifiers of improved design and lower cost probably cannot be used in the old circuit. The improved circuit disclosed herein uses two controlled rectifiers and two less power rectifiers but provides 50% higher output from the same type of devices. Moreover, any inexpensive rectifier may be used since there are no critical parameter requirements. The improved circuit herein is not subjected to the danger of commutation failure which is inherent with the old circuit since in the old circuit, the controlled rectifier had to be converted to a non-conducting state within about 10 microseconds.

The regulator disclosed herein is of the constant voltage type and is useful when alternator line or phase voltage is supplied to terminals $T_1$ and $T_2$. If a volts per cycle static exciter is desired, the output of the frequency sensitive sensing circuit would be connected across points 6 and 8. Similarly, to provide a speed regulator for an eddy current clutch, the rectifier tachometer voltage also would be connected to terminals 6 and 8.

Turning now to the circuit disclosed in FIGURE 2, the regulator illustrated includes the same basic sensing, reference, stabilizing, and firing circuits of FIGURE 1, but utilizes a separate power source for furnishing excitation power to the alternator field winding 12 and for providing the reference and firing voltages. 120 volt, 60 cycle power is supplied to the regulator from a separate source, although power sources of different voltage and frequency may be used depending on the particular regulator requirements. The desirability of using a separate power source results from the application where a variable frequency alternator operates over a wide speed range and the output of a rotatable exciter is not adequate at low speeds. A separate static exciter furnished with power from a separate fixed voltage power source therefore is preferred or the same power may be made available to an alternator field winding. As is well known, it frequently is necessary to regulate alternator output voltage proportional to frequency, as in driving a number of induction motors which require voltage to be approximately proportional to frequency. The circuit of FIGURE 2 provides boosting in the volts per cycle at the low frequency end of the regulator span.

As shown, the generator line voltage of 120 volts, 60 cycles is supplied from terminals $T_1$, $T_2$ through transformer 70 and reactor 72 to a full wave bridge having rectifier 16. Generator outputs of different voltage or frequency may be used dependent on the particular requirement. The rectified voltage is supplied to the sensing circuit and the sensed voltage appearing across points 3, 4 is compared with the reference voltage across points 5, 6. The reference voltage in the regulator is supplied from a separate power source having terminals $T_3$, $T_4$ through a rectifier bridge including rectifiers 74, 76. Depending on the polarity of terminal $T_3$ or $T_4$, the rectified voltage from rectifiers 74 is supplied through resistor 26 and is clipped and maintained constant by a pair of zener diodes 28. One zener diode may be used, but two preferably is employed for temperature compensation purposes. The clipped voltage is furnished through diode 30 to provide the reference voltage in the circuit.

When a difference between the sensed and reference voltages exists, transistor 34 fires to charge capacitor 40. If the difference is sufficiently great to warrant the application of additional excitation voltage to the field winding 12, capacitor 40 charges sooner and then discharges to transistor 36, causing it to conduct and provide a firing voltage earlier in the half cycle through either diode 43 or 44 to the gate of either rectifier 45 or 46. When $T_3$ is positive, rectifier 46 is made conducting to provide the additional excitation voltage to the field winding 12 for increasing the output voltage of the alternator. As in the previous modification, the cathode of controlled rectifier 45 is at a high positive level and therefore is precluded from conducting. The surge protector 78 is used for transient voltage suppression to prevent voltage spikes or surges from the input power supply from damaging the regulator components. As in previous modifications, when $T_4$ swings positive, controlled rectifier 45 conducts power to the field winding 12. By utilizing this kind of arrangement, utilizing diodes 76 there is no possibility for the voltage in the firing circuit collapsing when the controlled rectifier is conducting. In prior regulators, the reference voltage was common to the controlled rectifier cathodes and when it fired, the voltage was lost. The four rectifier bridge arrangement consisting of rectifiers 74 and 76 used in the circuit of FIGURE 2 herein always keeps the reference voltage on independent of the firing conditions of the controlled rectifiers 45 and 46. The voltage goes to zero twice per cycle and the time the voltage is at zero depends on the storage time in the rectifiers which in turn determines the rectifier turnoff time. When slow rectifiers were used, the turnoff time would approximately 10 microseconds thus requiring a faster turnoff time for the controlled rectifier. Since the different manufacturers of rectifiers provide them with different speeds or reaction, it is apparent that extreme difficulty could be encountered in selecting the circuit components to operate in the desired manner. This problem is now eliminated since the line voltage reversal is used to commutate the controlled rectifiers.

It will be apparent to those skilled in the art that the regulators described herein may be used for controlling DC rotating equipment by making simple changes in the regulator circuitry. For example, to control the output voltage of a DC generator at a desired level or at a varying level, such as in a program calling for voltage changes, the changes required to FIGURE 2 would merely involve eliminating the transformer 70, reactor 72 and rectifiers 16, and substituting therefor a DC sensed voltage.

It also will be apparent that the regulators described herein may be used in controlling an alternator furnishing a variable output voltage. To accomplish this, current transformers and resistors and diodes would be inserted in series with the sensed voltage applied to $T_1$ and $T_2$ of FIGURE 2. In FIGURE 1 for example, the potentiometer 22 could be varied with time to give a variation in the alternator output voltage as desired.

In view of the above, it will be apparent that modifications and variations are possible in light of the above teachings. It therefore is to be understood that within the scope of the appended claims, the invention may be practiced other than as specifically described.

What we claim as new and desire to secure by Letters Patent of the United States is:

1. A regulator useful in controlling the operation of electrical rotating equipment comprising:
   terminals on said regulator adapted for connection to said equipment,
   means connected with said terminals for detecting voltage output levels in the equipment and for establishing a sensed voltage in the regulator,
   a reference and firing voltage circuit means providing an input power voltage to said circuit,
   stabilizing means connected between the sensing means and the firing and reference voltage circuit, said stabilizing means comprising a resistor and a capacitor connected between said selectively operable conducting means and said field winding for providing a negative feedback voltage to the firing and reference voltage circuits,
   a surge filter connected across said reference and firing circuit for clipping extraneous pulses, said surge filter comprising a diode, capacitor and resistor,
   said circuit comprising means reducing the magnitude of the input power voltage and for maintaining it at a predetermined level,
   voltage comparing devices interconnecting said voltage reducing and maintaining means with the means establishing said sensed voltage for detecting the difference between said sensed and reference voltages to provide a difference voltage,
   current conducting components connected with said comparing devices and responsive to said difference voltage,
   triggering elements connected with said conducting components and sensitive to the current conducted therethrough,
   a pair of semiconductor devices connected to said terminals and to the output of said triggering elements,
   a field winding for said equipment connected to said semiconductor devices and to the terminals,
   a diode connected between each of said semiconductor devices and said triggering elements,
   said diodes and semiconductor devices being connected in said circuit such that when one of said diodes allows current flow from said triggering elements to its respective semiconductor device, the other diode blocks voltage from its semiconductor device to the triggering elements, all according to the polarity of voltage applied by the means providing the input power voltage, whereby excitation power is supplied to said field winding during the time said semiconductor devices are in an operative condition.

2. The combination according to claim 1 wherein said semiconductor devices comprise silicon controlled rectifiers.

3. The combination according to claim 1 wherein the means providing an input voltage comprises the output from an alternator connected to a varying load.

4. The combination according to claim 1 wherein the means providing an input voltage comprises a separate power supply having a constant output voltage, and wherein said terminals are connected to the output of an alternator serving a varying load.

References Cited

UNITED STATES PATENTS

| | | | |
|---|---|---|---|
| 3,100,279 | 8/1963 | Rohner | 318—193 X |
| 3,151,288 | 9/1964 | Auizienis et al. | 322—28 |
| 3,209,236 | 9/1965 | Bridgeman | 322—28 |
| 3,299,342 | 1/1967 | Rath | 322—28 |

MILTON O. HIRSHFIELD, *Primary Examiner.*

J. D. TRAMMELL, *Assistant Examiner.*